(No Model.) 3 Sheets—Sheet 1.

J. CRAGG.
APPARATUS FOR EXTRACTING GOLD OR SILVER FROM ORES.

No. 449,813. Patented Apr. 7, 1891.

WITNESSES
Dan'l Fisher
B. M. Stroud

INVENTOR
Joseph Cragg (No Model.)

J. CRAGG.
APPARATUS FOR EXTRACTING GOLD OR SILVER FROM ORES.

No. 449,813. Patented Apr. 7, 1891.

(No Model.)  3 Sheets—Sheet 3.

J. CRAGG.
APPARATUS FOR EXTRACTING GOLD OR SILVER FROM ORES.

No. 449,813.  Patented Apr. 7, 1891.

WITNESSES  
Dan'l Fisher  
B. W. Howard

INVENTOR  
Joseph Cragg,  
by G. H. & W. S. Howard,  
atty.

UNITED STATES PATENT OFFICE.

JOSEPH CRAGG, OF BALTIMORE, MARYLAND, ASSIGNOR TO SAMUEL WILKINS CRAGG, OF SAME PLACE.

APPARATUS FOR EXTRACTING GOLD OR SILVER FROM ORES.

SPECIFICATION forming part of Letters Patent No. 449,813, dated April 7, 1891.

Application filed January 7, 1890. Serial No. 336,146. (No model.)

*To all whom it may concern:*

Be it known that I, JOSEPH CRAGG, of the city of Baltimore and State of Maryland, have invented certain Improvements in Apparatus for Extracting Gold or Silver from Ores, of which the following is a specification.

This invention relates to certain improvements in that class of apparatus for extracting gold or silver from their ores in which the metals are attacked by chlorine, bromine, or the like reagents, and thereby reduced to soluble salts, which are removed from the ores by lixiviation and the metals finally recovered by precipitation, as will hereinafter fully appear.

In the further description of the said invention which follows reference is made to the accompanying drawings, forming a part hereof, and in which—

Figure 1:
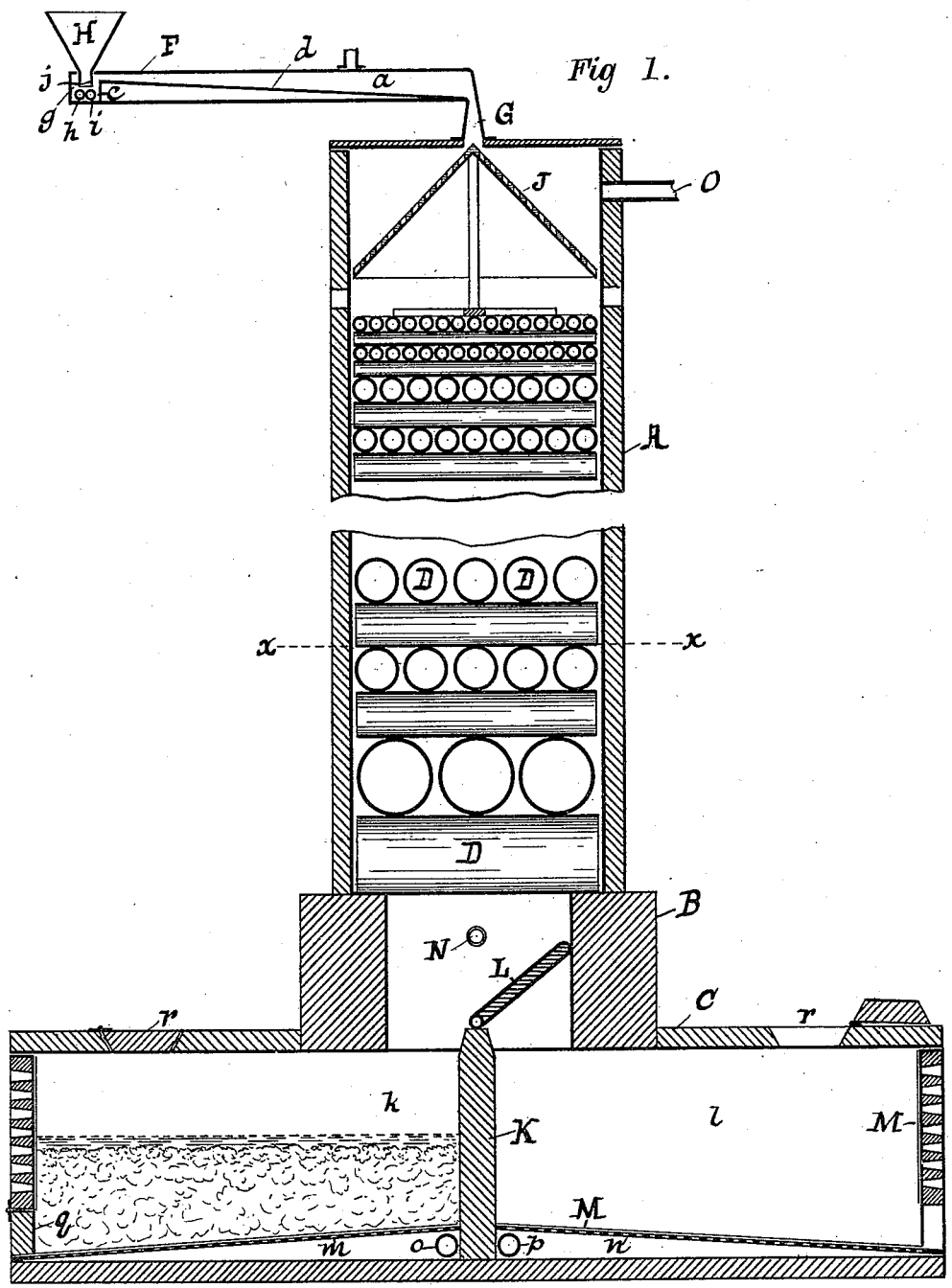
Figure 2:
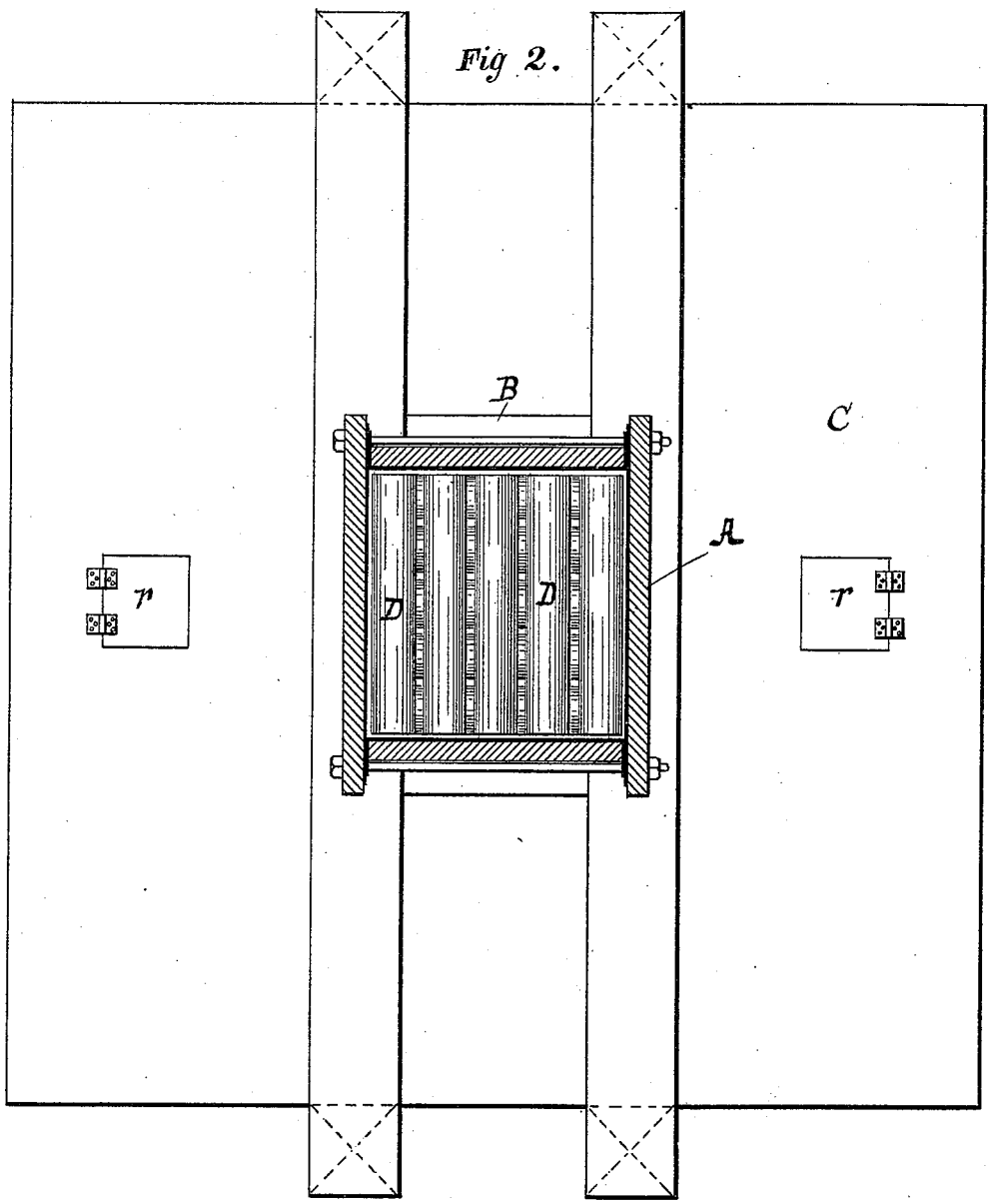
Figure 3:
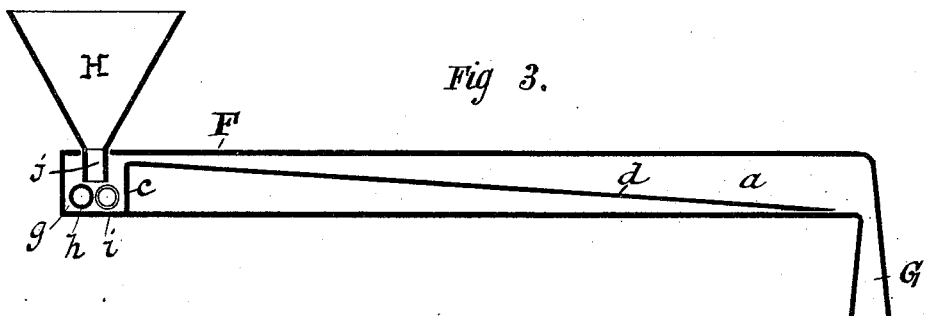
Figure 4:
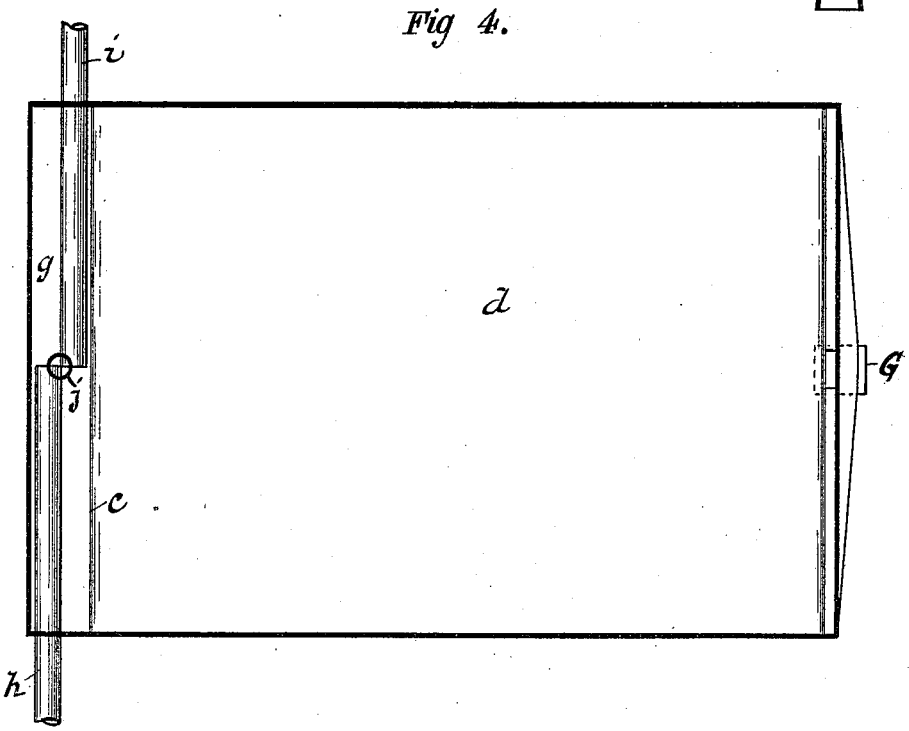

Figure 1 is a vertical central section of the improved apparatus; and Fig. 2, a transverse section of the same, taken on the dotted line $x \, x$, Fig. 1. Figs. 3 and 4 are respectively a cross-section and a sectional plan of that part of the apparatus wherein the ground ores and liquids are thoroughly mixed and made into a thin liquid pulp of uniform density.

Similar letters of reference indicate similar parts in all the views.

In the said drawings, A represents the tower in which the liquid pulp to be treated is introduced. This tower may be constructed of any suitable material and in any shape; but it is preferably made of wood lined with sheet-lead and of a rectangular cross-section, in order that the sheet-lead may be used to form a gas and water tight joint where the sides of the tower come in contact with each other, as shown in Fig. 2. The tower A is seated on a rectangular base B, which in turn rests on a tank or vat C, hereinafter more fully described. The tower is filled or partially filled with cylindrical bars D, not connected to the sides of the tower, and of different sizes, stacked in layers which are crossed. The lowest layer of bars rests on the base B, which projects beyond the inner face of the tower, and the others are piled or stacked on them, with small spaces between them to allow of the passage down the tower of the liquid pulp. I prefer to make the bars of glass and in the form of hollow cylinders, and they are stacked, as before stated, with the largest ones below and with the size of the bars diminishing toward the top, as shown in Fig. 1.

The desired separation of the bars in each layer or row is easily effected by inserting between them narrow strips of sheet-lead or by encircling the bars with narrow rubber bands of the requisite thickness. By having the bars D cylindrical, crossed, and separated the pulp will follow the surface of the bars in each series or section until it reaches the lowest point, from which it drops to the next series below. This results in the thorough breaking up of the small bodies of liquid containing particles of gold and the continued exposure of the said particles to the action of the gas. This effect cannot be obtained with stacked brick or regular or irregular shaped bodies in contact with each other.

F is the mixer, wherein the ore and liquid are mixed to the consistency of very thin pulp; and it consists of a closed tray $a$, which is erected over the tower, with a channel G extending downward therefrom to the upper part of the tower. Within this tray is a partition $c$, which extends from the bottom to near the top, and from the edge of the partition leads an inclined plate $d$, which terminates over the pipe G. The partition $c$ forms within the tray $a$ gutter or trough $g$, which extends transversely of the same. The liquid-pipes $h$ and $i$ enter it from opposite sides and end or terminate at the center. (See Figs. 3 and 4.) These pipes are out of alignment, as shown. In the center of the trough and directly over the point where the two pipes meet is a hopper H, into which the ore or material is introduced, with a pipe $j$ leading from it to the trough.

J is a perforated conical or pyramidal distributer for the liquid pulp, situated in the upper part of the tower and supported, preferably, from the top layer or row of bars by means of a stalk with a spreading base.

The tank or vat hereinbefore alluded to is divided by a bulk-head K into two chambers $k$ and $l$, and either of these chambers may be placed in communication with the lower by means of a swinging door L, which constitutes the upper end of the said bulk-head. The stem or shaft of the swinging door L passes through suitable stuffing or packing boxes (not shown) at the sides of the base to prevent leakage. The chambers $k$ and $l$ are each furnished with an inclined perforated or grated false bottom $m$ and $n$, and beneath these false bottoms are pipes or openings $o$ and $p$, which lead to the precipitating-tanks. (Not shown.) The front wall of each chamber is fitted with a door $q$, through which the solid contents may be washed out when the same have been freed from the valuable salts, and above this door the wall is perforated, as shown. The perforated front walls and the false bottoms are covered with some suitable filtering material, such as cotton-duck, which in the drawings is denoted by M.

The top of the tank or vat is provided with man-holes $r$, through which access to its contents may be had, and both the tower and vat may be provided with a number of peep-holes, through which the interior of the same can be inspected.

The pipes for the entrance and exit of the gas are respectively denoted by N and O.

The operation of treating ores by means of my improved apparatus is as follows: The ore is ground or pulverized to a finely-divided condition and introduced into the hopper H, from which it passes through the pipe $j$ to the trough $g$. On entering the trough it is divided into two streams, one falling in the front of each of the pipes $h$ and $i$. At the same time the liquid is admitted to the trough from an elevated tank (not shown) through the said pipes, and meeting with the finely-ground ore carries it in opposite directions in the trough. The effect of these reverse currents is to thoroughly mix the ore and liquid and form a very thin pulp, which is uniform in its density, and this pulp passes over the partition $c$ and down the inclined plate $d$ to the channel G, and thence into the tower. The gas is introduced to the tower through the pipe N, and then finds its exit through the pipe O. The liquid pulp on striking the first or top row of bars or surfaces is formed into thin films or waves, which, as they fall to the larger surfaces in their descent, become thinner, and by this gradual thinning and mixing of the waves or films the particles of gold are more readily exposed to the action of the reagents present. By having the bars D loose within the tower the lead lining need not be perforated, as would be the case if the bars were supported from the tower instead of from the base, as shown. At the beginning of the operation the pipe $p$ is closed by means of a cock. (Not shown.) Consequently after the filling of the space below the false bottom the filtering takes place at the front of the vat. The arrangement of the front filter facilitates the filtering operation and greatly increases the capacity of the vat, and the ore does not choke the filters, as it does at the false bottom, but is deposited, and the comparatively clear liquid on the top of the ore is brought directly in contact with the filters. When the chamber $l$ is entirely full of pulp, the position of the swinging door L is reversed and the liquids and pulp conducted to the other chamber $k$. During the filling of the second chamber of the vat the pipe $p$ is opened, and the ore on the filter above is washed by fresh water introduced through the man-hole $r$ until the water passing from the pipe $p$ shows no decided trace of the chlorides. The ore is then discharged through the door $q$. Suitable conduits lead from the front filters to precipitating-vats, (not shown,) in which any of the well-known methods of recovering the chlorides or the like held in solution may be practiced. The chlorine which passes from the tower may be carried to a purifying apparatus, where it is freed from impurities by well-known means and used again.

With this apparatus it is not designed to use steam-coils or other appliances in the tower to heat the liquid reagents; but instead I may heat it by contact with heated pulp. By this means I am enabled to much simplify the apparatus without reducing its efficiency in that respect.

Cold solutions of the reagents—such as chlorine, bromine, and the like—are more stable than warm or hot solutions; but it is a great advantage to heat the said solutions when in contact with the ore. I accomplish this by operating in the closed vessel described, into which I can introduce heated ore, which will raise the temperature of the solution to the most effective point.

I claim as my invention—

1. In an apparatus for extracting gold or other metals from their ore in solution, a tower consisting of a series of superimposed sections decreasing in area from the lower to the upper, combined with an inclosed stack of cylindrical bars crossed and separated, the bars in each ascending section being of smaller diameter than those in the section immediately below, substantially as specified.

2. In an apparatus for extracting gold or other metals from their ores in solution, a tower and a mixer which consists of a trough having pipes to conduct the reagents in liquid solution, which enter the same from different sides and terminate out of alignment about centrally of the trough, combined with a hopper placed over the ends of the said pipes and an overflow-plate leading to the said tower, all combined substantially as specified.

3. In an apparatus for extracting gold or other metals from their ores in solution, a mixer which consists of a tray, a portion of which is partitioned off by means of a plate to form a trough, an inclined plate leading from the edge of the said trough, adapted as an overflow, liquid-pipes which enter the trough at each end thereof and terminate out of alignment near the center, and a hopper and pipe leading therefrom to the said trough and over the ends of the two pipes, all combined substantially as specified.

4. In an apparatus for extracting gold or other metals from their ores, the combination of a tower having means for the entrance of liquid pulp thereto and for the admission and exit of chlorine or equivalent gas, and a tank or vat in communication with the said tower, having side or front filters, substantially as specified.

5. In an apparatus for extracting gold or other metals from their ores in solution, the combination of a tower having means for the entrance of pulp and liquid thereto and for the admission and exit of chlorine or equivalent gas, a tank or vat underneath and in communication with the said tower, divided by a bulk-head into separate chambers, a swinging door whereby either of the said chambers may be isolated from the tower, and filters arranged to separate the liquid from the solid portion of the matter carried from the tower to the said chamber, substantially as specified.

JOSEPH CRAGG.

Witnesses:
WM. T. HOWARD,
DANL. FISHER.